United States Patent
Pontius et al.

[11] Patent Number: 6,029,243
[45] Date of Patent: Feb. 22, 2000

[54] FLOATING-POINT PROCESSOR WITH OPERAND-FORMAT PRECISION GREATER THAN EXECUTION PRECISION

[75] Inventors: Timothy A. Pontius, Lake in the Hills, Ill.; Kenneth A. Dockser, Morrisville, N.C.

[73] Assignee: VLSI Technology, Inc., San Jose, Calif.

[21] Appl. No.: 08/934,449

[22] Filed: Sep. 19, 1997

[51] Int. Cl.[7] .................................................. G06F 9/302
[52] U.S. Cl. .......................... 712/222; 708/495; 708/510
[58] Field of Search ....................... 395/563; 364/748.01, 364/748.16; 712/222; 708/495, 510

[56] References Cited

U.S. PATENT DOCUMENTS

| | | | |
|---|---|---|---|
| 4,823,260 | 4/1989 | Imel et al. ................................ | 395/563 |
| 5,027,272 | 6/1991 | Samuels .................................... | 395/566 |
| 5,268,855 | 12/1993 | Mason et al. ........................ | 364/748.19 |
| 5,481,686 | 1/1996 | Dockser .................................... | 395/563 |
| 5,523,961 | 6/1996 | Naini ................................... | 364/715.03 |

*Primary Examiner*—Krisna Lim
*Attorney, Agent, or Firm*—Clifton L. Anderson

[57] ABSTRACT

A floating-point processor nominally capable of single and double, but not extended, precision execution stores operands in extended-precision format. A format converter converts single and double precision source values to extended-precision format. Trap logic checks the apparent precision of the extended-precision operands and the requested result precision to determine whether the floating-point processor can execute the requested operation and yield the appropriate result. If the maximum of the requested precision and the maximum apparent precision of the operands is single or double, the requested operation is executed in hardware. Otherwise, a trap is issued to call an extended precision floating-point subroutine. This approach augments the class of operations that can be handled in hardware by a double-precision floating-point processor, and thus improves the floating-point computational throughput of an incorporating computer system.

8 Claims, 2 Drawing Sheets

FLOATING-POINT PROCESSOR WITH OPERAND-FORMAT PRECISION GREATER THAN EXECUTION PRECISION

BACKGROUND OF THE INVENTION

The present invention relates to floating-point processing and, more particularly, floating-point processing with multiple precisions. A major objective of the present invention is to provide higher performance in an economical floating-point processor.

Floating-point processors are specialized computing units that perform certain arithmetic operations, e.g., multiplication, division, trigonometric functions, and exponential functions, at high speeds. Accordingly, high-power computing systems often incorporate floating-point processors, either as part of a main processor or as a coprocessor.

"Floating-point" describes a class of formats for expressing numbers. A typical floating-point format describes a number by identifying its sign, its exponent and its mantissa. For example, 100/3 equals $33.\overline{3}$. This number can be approximated in floating-point format as $(+)(10^2)(0.333)$. However, it can be more precisely expressed as $(+)(10^2)(0.333333)$. To calculate $(100/3)^2 = 1111.\overline{1} = (+)(10^4)(\overline{0.1})$ using the lower precision floating-point format, one would get $(+)(10^4)(0.110889)$. Only the first three digits are considered significant, so the result would be rounded and expressed as $(+)(10^4)(0.111)$. Using the higher precision format, one would get $(+)(10^4)(0.111110888889)$. Rounding this to six significant figures results in $(+)(10^4)(0.111111)$. Note that the latter answer is more accurate, but requires more time to calculate.

Floating-point processors express numbers in binary form (with strings of 1s and 0s) instead of decimal form. Three precisions, taken from the ANSI/IEEE standard 754-1985, are commonly employed: "single" 32-bit precision provides for a 1-bit sign, an 8-bit exponent, and a 24-bit mantissa; "double" 64-bit precision provides for a 1-bit sign, an 11-bit exponent, and a 53-bit mantissa; and "extended double" or "extended" 80-bit precision provides for a 1-bit sign, a 15-bit exponent, and a 64-bit mantissa. In the case of IEEE single and double precision, the most significant mantissa bit is not stored in the encoding, but is implied to be "0" or "1" based on the exponent.

A processor that executes floating-point operations with all three precisions is disclosed in U.S. Pat. No. 5,481,686 to Kenneth A. Dockser. An important innovation in that patent is the detection of apparent precision to reduce the execution precision required in some cases to improve throughput. For example, an extended precision value can be treated as a double precision value where there are a sufficient number of trailing zeroes in the mantissa. When two extended-precision values with apparent double precision are to be multiplied, the multiplication can be performed at double precision when the requested result precision is double.

In most applications, the greater precisions are used more rarely than the lesser precisions. Extended precision, in particular, is encountered at most infrequently in many computational environments. Accordingly, the larger registers and more complex execution units required to implement extended precision in a floating-point processor can be dispensed with in favor of lower costs or alternative functionality.

When a processor without extended precision capability encounters an instruction calling for such capability, a trap can be executed to call a subroutine that implements the extended precision operation. For example, instructions to load extended precision values are trapped; the called routine stores the values or pointers to the values in memory rather than in registers of the floating-point processor. When an instruction to execute an extended precision operation is received, a trap is executed that calls a suitable extended precision software routine. The extended precision software routine accesses extended precision values formerly stored in memory and performs the requested operation.

While justifiable from a cost or functionality perspective, this software execution is much slower than the alternative hardware. What is needed is a system that substantially achieves the savings of a floating-point processor without extended precision capability but provides higher performance.

SUMMARY OF THE INVENTION

The present invention provides a floating-point processor which stores operands with format precision higher than its nominal execution precision. A format converter can convert operands of a lesser precision format to the higher precision format so that only one format needs to be operated on. For example, a floating-point processor capable of double and single precision execution stores operands in extended precision format. When an operation is called for that exceeds the execution capability of the floating-point execution unit, a trap is executed so that a suitable software routine can be called to execute the trapped floating-point instruction.

Preferably, logic for determining when to execute a floating-point operation in hardware and when to trap makes its determination as a function of a requested result precision and the maximum apparent precision of the operands. For example, the execution precision can be set equal to the maximum of the requested result precision and the maximum apparent precision of the operands. However, more sophisticated logic can be used so that more operations are performed in hardware to enhance throughput.

The present invention can be considered a modification of the full-precision floating-point processor disclosed in U.S. Pat. No. 5,481,686. A more conventional modification to utilize a double-precision floating-point processor would convert operands to double-precision format and use double-precision registers. Relative to this conventional modification, the present invention incurs a slight penalty in that double-precision operands are converted to extended precision before being operated on in double precision. However, when used in combination with apparent precision detection, this penalty can be more than offset.

Since high-precision operands are accommodated, there is no need to trap on high (e.g., extended) precision "load" and "store" instructions. This reduces latency and obviates the need for virtual registers in memory for storage of high precision operands and results. There is also a saving in complexity in that tag bits are not required to indicate the precision of stored operands. All stored operands have the same nominal precision (high, extended); apparent precision detection provides the information most relevant to the selection of an execution precision.

Logic for selecting execution precision is used to determine whether an operation is to be performed in hardware or in software (in response to a trap). A simple approach is to set the execution precision equal to the maximum of the requested result precision and the maximum apparent precision of the operands. When the execution precision is within the capability of the execution unit, the operation is performed in hardware; when the execution precision is too high for the execution unit, a trap is executed to initiate execution in software. In this approach, a high requested result precision always results in a trap.

More sophisticated logic can be used to determine when execution of an operation at a lower precision can yield the same result as the operation executed at the higher precision. For example, double-precision multiplication of two operands with apparent precision of single can yield the same result as extended-precision multiplication of the same operands. Accordingly, in some cases, logic can provide for hardware execution even where the requested result precision is high. This yields a further improvement in floating-point throughput. Thus, higher performance is achieved together with the cost and/or functionality savings associated with a limited-precision floating-point processor. These and other features and advantages of the present invention are apparent from the description below with reference to the following drawings.

DESCRIPTION OF THE PREFERRED EMBODIMENTS

Figure 1:
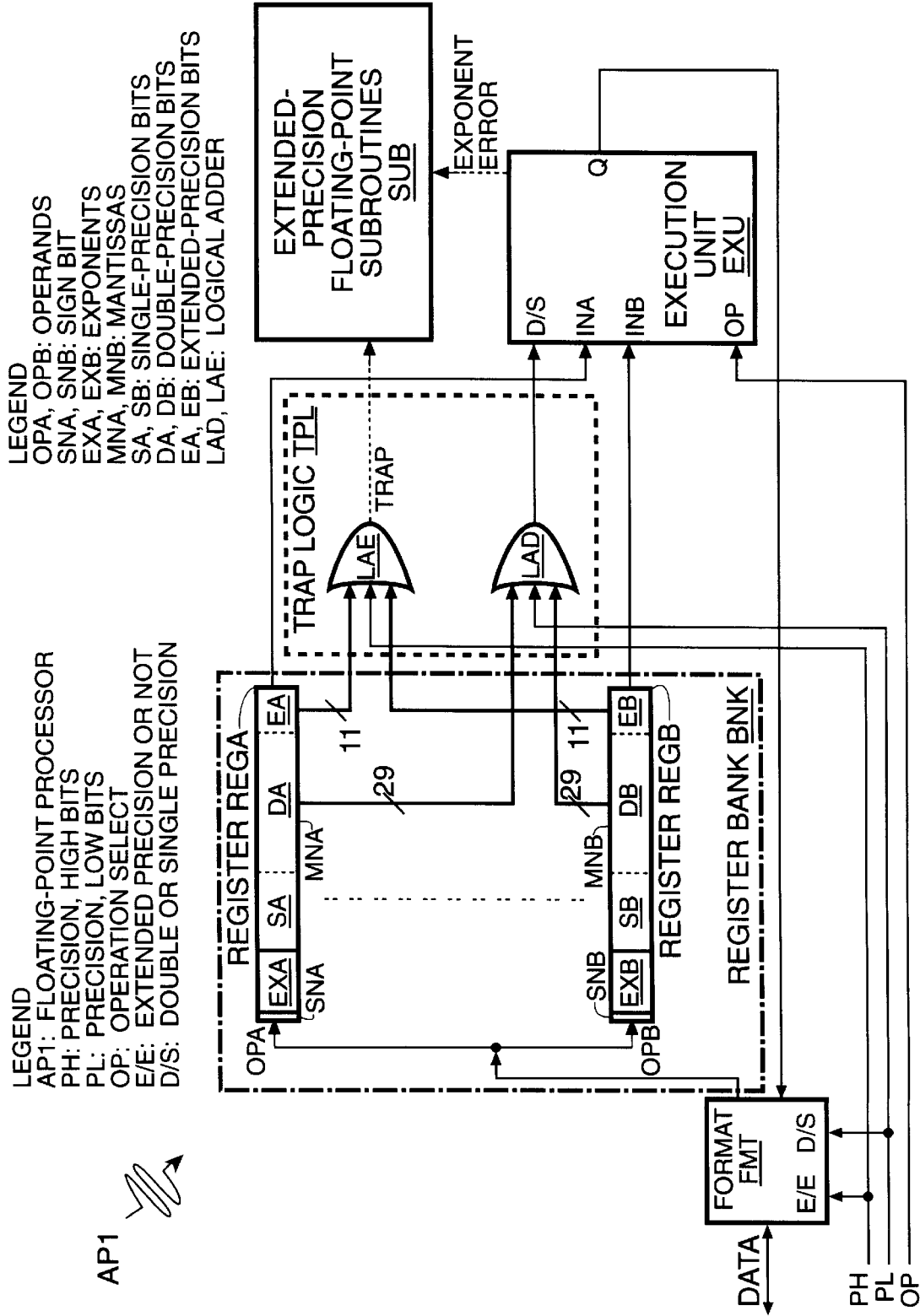
FIG. 1 is a schematic diagram of a floating-point processor in accordance with the present invention.

A floating-point processor AP1 comprises a format converter FMT, a bank BNK of eight extended precision registers, trap logic TPL, and an execution unit EXU, as shown in FIG. 1. Execution unit EXU is double-precision in that mantissa precision is limited to 53 bits. However, extended 15-bit exponents can be handled. Inputs to processor AP1 include data DATA, a high-order precision selection line PH, a low-order precision selection line PL, and an operation selection line OP. The outcome of a floating-point operation can be a result Q or a trap or an error calling one of the extended-precision software routines SUB of the incorporating computer system.

The data DATA can include source values expressed in any of three floating-point precision formats: single precision, double precision, and extended precision. Format converter FMT converts source values not in extended-precision format to extended-precision format by adjusting the exponent, appending trailing zeroes to the mantissa, and make the integer bit explicit. Source values originally in extended precision are left in that format. Format converter FMT thus provides operands OPA and OPB in extended-precision format to respective registers of bank BNK, namely, REGA and REGB.

Like all registers of bank BNK, register REGA is designed to store a binary extended-precision floating-point number. Accordingly, register REGA has a 1-bit sign section SNA, a 15-bit exponent section EXA, and a 64-bit mantissa section MNA. Mantissa section MNA includes three subsections: a 24-bit "single-precision" subsection SA consisting of the 24 most significant mantissa bits, a 29-bit "double-precision" subsection DA consisting of the 25th through 53rd most significant mantissa bits, and an 11-bit "extended-precision" section EA consisting of the 54th through 64th most significant (and thus the 11 least significant) mantissa bits. Matching register REGB analogously includes a sign section SNB, an exponent section EXB, and a mantissa section MNB, the latter including a "single-precision" subsection SB, a "double-precision" subsection DB, and an "extended-precision" subsection EB. The mantissa subsections are labeled to reflect their respective roles in indicating apparent precision.

Trap logic TPL includes two logical adders LAE and LAD. Logical adder LAE is effectively a 23-bit OR gate. It has as its inputs 11 bits from extended-precision subsection EA, 11 bits from extended-precision subsection EB, and 1 bit from high-order requested precision input to floating-point processor FPP. The output of logical adder LAE is high when: 1) any bit of subsection EA is high, indicating that the apparent precision of mantissa MNA is "extended"; or 2) when any bit of subsection EB is high, indicating that the apparent precision of mantissa MNB is "extended"; or 3) when line PH is high, indicating that an extended precision floating-point result is being requested. The output of logical adder LAE is used to determine whether or not a trap is to be executed to call an extended-precision operation subroutine of subroutines SUB. If the output of logical adder LAE is high, a trap is issued; if this output is low, no trap is issued. If no trap is issued, execution unit performs the requested floating-point operation.

Logical adder LAD is effectively a 59-bit OR gate. It has as its inputs: the 29 bits of subsection DA, the 29 bits of subsection DB, and one bit from the low-order requested precision input PL to floating-point processor AP1. The output of logical adder LAD is thus high when: 1) any bit of subsection DA is high, indicating that the apparent precision of mantissa MNA is not "single"; 2) any bit of subsection DB is high, indicating that the apparent precision of mantissa MNB is not "single"; or 3) the low-order requested precision input PL is high, indicating that the requested result precision is either "double" or "extended" but not "single". The output of logical adder LAD is low when all 59 bits are low, indicating that the greater of the apparent and requested precisions is not "double". The output of logical adder LAD is used to determine whether execution unit EXU is to perform a floating-point operation at single or double precision when a trap is not executed.

When a trap is not called, execution unit EXU performs the operation requested at processor input OP at the precision selected by logical adder LAD on operands OPA and OPB stored in registers REGA and REGB. The result, which is in the requested precision is directed from output Q to format converter FMT. Execution unit EXU can flag an "exponent" error if the exponent is too large for the requested result precision; the exponent error flag can be used to call a floating-point error handling subroutine of subroutines SUB.

Format converter FMT converts results, as necessary, to extended precision format for storage in one of the registers of bank BNK; for example, the result can be stored in register REGB, overwriting operand OPB. In the event of a "store" instruction, an extended precision value stored in a register is converted by format converter FMT to the precision called for by the store instruction; this precision is indicated at format converter inputs E/E and D/S, which are respectively coupled to processor inputs PH and PL. If PH is high, "extended precision" was requested, the output data is not converted. If PH is low, the requested precision is indicated by processor input PL. Thus, if PH is low and PL is high (01), format converter FMT converts to double-precision format, rounding the mantissa and adjusting the exponent as required. If PH is low and PL is low (00), format converter FMT converts to single-precision format, again rounding the mantissa and adjusting the exponent.

Figure 2:
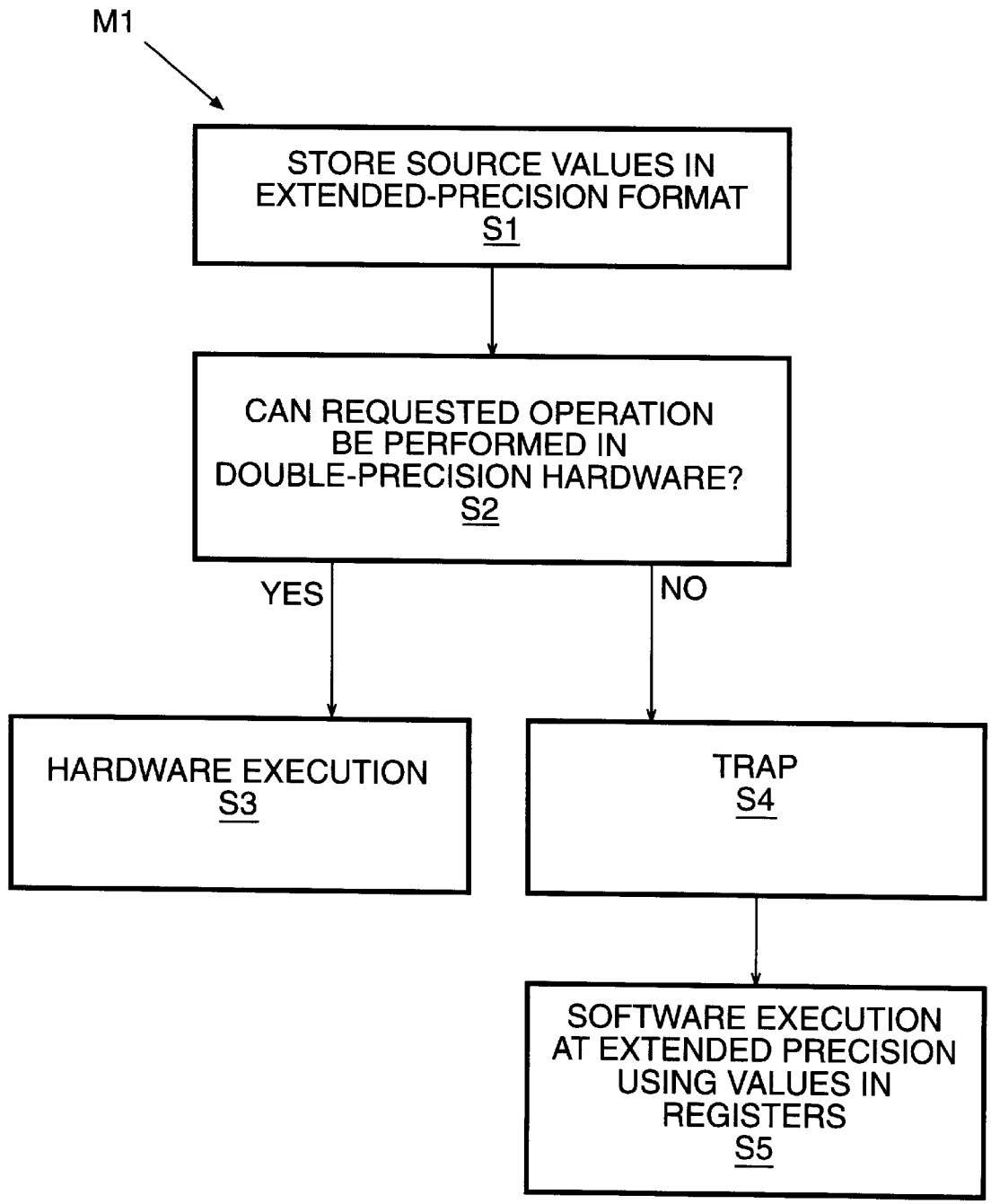
FIG. 2 is a flow chart of a method of the present invention used in conjunction with the processor of FIG. 1.

A method M1 as practiced in the context of floating-point processor AP1 is flow-charted in FIG. 2. Given are source values, a requested operation, and a requested result precision. The source values are converted, as necessary, to extended precision at step S1 for storage in registers REGA and REGB.

At step S2, a determination is made whether or not the requested operation can be performed accurately by double-precision execution unit EXU. This determination is made by trap logic TPL as a function of the apparent precision of the operands and the requested result precision. An execution precision is set at step S2 equal to the maximum of: 1) the requested result precision, and 2) the maximum apparent precision of the operands.

If the determination is that the operation can be performed in hardware, execution unit EXU performs the operation. The requested operation is then executed at the execution precision at step 13, preferably with the mantissas truncated to the execution precision and the exponents remaining at extended precision. Format converter FMT converts the result to extended precision for storage in bank BNK.

If a determination is made that the operation cannot be performed by double-precision execution unit (because too many mantissa bits of precision are required), a trap is executed at step S4. This trap is used to call an extended precision floating-point subroutine SUB at step S5 so that the operation can be performed in software using values stored in registers RGA and RGB.

While the improper execution of an operation in hardware is unacceptable (since an erroneous result is obtained), execution in software of an operation that could have been executed in hardware only results in less than optimal performance. More complex trap logic can make more sophisticated allocations of operations between hardware and software; however, the more complex logic reduces the savings in cost and complexity achieved by omitting the capability of hardware extended precision execution.

Floating-point processor AP1 makes a relative simple determination—setting the execution precision equal to the maximum of the requested precision and the maximum apparent precision. However, in some cases, the requested precision can be extended but execution unit can still perform the operation without error because the apparent precisions of the operands are sufficiently low that no rounding errors occur if the operation is performed as a double-precision operation. For example, if two operands have single-precision apparent precision, a double-precision multiplication yields the same result as an extended-precision multiplication.

Still more sophisticated trap logic can determine the total number of trailing zeroes in all operands for an operation. Even if one operand requires at least double precision, the other operand may have a sufficient number of trailing zeroes that the operation can be performed in hardware.

While the foregoing describes the preferred embodiment, the invention provides for the following variations and modifications. Operations are provided for in addition to or in place of multiplication and division. Some of these operations, such as square root and trigonometric functions require only one operand, while others, such as multiply-add, can require more than two operands. Accordingly, the number of source values ranges from one to two or more.

While the present invention is most applicable when there are at least two requestable precisions, the present invention provides for as few as one requested result precision. As long as the requested result precision is less than the maximum nominal operand precision, the invention affords reductions in latencies. The invention also provides for higher numbers of precisions. Furthermore, the precisions can be differentiated by as few as one bit.

The present invention provides for considerable variation in the trap logic. In the preferred embodiment, the maximum apparent precision is determined directly. In a major alternative embodiment, the trap logic scans each register independently to determine its apparent precision. The results are stored in a flag register. The contents of these flag registers are then compared to the requested result precision to determine the execution precision. The preferred trap logic scans only the mantissa, but exponents can be scanned and used in the selection of execution mode.

More sophisticated trap logic is also provided for. In general, the execution precision is at least as fine as the requested result precision. However, exceptions can be made to further reduce latencies. For example, when the sum of two apparent operand precisions measured in bits is less than or equal to 24 bits, a multiplication can be performed in single precision even where double or extended results are requested. In general, more complex scanning of the operands can identify more situations in which a low execution precision can be performed without affecting the result.

Note that there is no necessary correspondence between the precisions that can be requested and those that can be executed. For example, while requested precisions might be limited to three levels of precision, execution precision can be advantageously selected to the individual bit to maximize latency reduction. The tradeoff is that the complexity of the logic required to select the optimum precision at the bit level adds latencies of its own.

The preferred execution unit truncates mantissas to correspond to the execution precision, while leaving exponents in extended precision. Alternatively, both exponents and mantissas can be converted to the execution precision. Preferably, such an execution unit is used in conjunction with trap logic that scans exponents as well as mantissas to determine apparent precision. Otherwise, the execution unit or result format converter should flag exponent conversion errors.

The preferred embodiment provides results initially in extended precision format. Alternatively, the execution unit can be designed to provide results directly in the requested result precision. This approach makes the most sense in systems using a fixed result precision. In such cases, a result format converter is not required. These and other modifications to and variations upon the preferred embodiments are provided for by the present invention, the scope of which is limited only by the following claims.

What is claimed is:

1. A floating-point processor for a multiple-precision computer system that performs a floating-point operation on an operand set of operands and that yields the result in a requested result precision, said requested result precision being selected from a precision set of at least two precisions including a highest precision, each precision of said precision set having a corresponding numerical format so that said highest precision has a highest-precision format, each operand of said operand set having a nominal precision, each operand of said operand set having an exponent and a mantissa, each operand of said operand set having an apparent precision that is a function of the number of trailing zeroes in its mantissa, said operand set having a maximum apparent precision equal to the maximum of the apparent precisions of said operands, said floating-point processor comprising:

input means for receiving said operand set, and a set of instructions specifying said operation and said requested result precision;

format conversion means for converting operands of said operand set not in said highest-precision format into said highest-precision format;

register means for storing said operands of said operand set in said highest precision format;

precision selection means for selecting an execution precision as a function of said requested result precision and said maximum apparent precision;

an execution unit for performing said operation with said execution precision on said operand set to yield an execution result when said execution precision is not said highest precision; and trap means for executing a trap when said execution precision is said highest precision;

whereby, in response to said trap, said computer system can perform said operation in software at said highest precision.

2. A floating-point processor as recited in claim 1 wherein said execution precision is equal to the maximum of said requested result precision and said maximum apparent precision.

3. A floating-point processor as recited in claim 1 wherein:

said precision set consists of extended precision, double precision, and single precision; and said register means includes a register set of registers, each register of said register set including a respective exponent section and a respective mantissa section, each mantissa section including a single precision subsection, a double precision subsection, and an extended precision subsection.

4. A floating-point processor as recited in claim 1 wherein said precision-selection means includes:

a first logical adder for determining whether or not extended precision is either the requested result precision or the apparent precision of any operand, in which case said execution precision is extended; and a second logical adder for determining whether said requested result precision is not double and none of said operands has an apparent double precision, in which case said execution precision is single if it is not extended, otherwise said execution precision is double if it is not extended.

5. A floating-point method for performing a requested floating-point operation at a requested result precision on an operand set of operands to achieve a result, said requested result precision being selected from a set of plural precisions including a highest precision, said method comprising;

storing said operands in a highest precision format in respective registers of a floating-point processor;

determining an execution precision as a function of said requested precision and the maximum apparent precision of said operand set, said maximum apparent precision being a function of the number of trailing zeroes in the operand having said maximum apparent precision;

if said execution precision is less than said highest precision, performing said requested floating-point operation using a hardware execution unit of said floating-point processor; and if said execution precision is said highest precision, executing a trap and performing said requested floating-point operation in software.

6. A method as recited in claim 5 wherein said execution precision is equal to the maximum of said requested precision and said maximum apparent precision.

7. A method as recited in claim 5 further comprising converting received source values to said operands by converting the formats of any of said source values having a format less than said highest precision to said highest precision format.

8. A method as recited in claim 7 wherein each of said precisions is selected from the set consisting of extended precision, double precision, and single precision, said highest precision being extended precision.

* * * * *